US012623953B2

(12) United States Patent
Fotheringham et al.

(10) Patent No.: US 12,623,953 B2
(45) Date of Patent: May 12, 2026

(54) GLASS COMPOSITION, GLASS ARTICLE AND USE THEREOF

(71) Applicant: Schott AG, Mainz (DE)

(72) Inventors: Ulrich Fotheringham, Mainz (DE); Azatuhi Ayrikyan, Alfortville (FR); Thomas Pfeiffer, Ingelheim (DE); Simone Monika Ritter, Mainz (DE); Silke Wolff, Mainz (DE); Tobias Gotschke, Gau-Bischofsheim (DE); Christoph Groß, Mainz (DE); Antje Greiff, Frankfurt am Main (DE); Jens Ulrich Thomas, Mainz (DE); Martin Letz, Mainz (DE)

(73) Assignee: Schott AG, Mainz (DE)

( * ) Notice: Subject to any disclaimer, the term of this patent is extended or adjusted under 35 U.S.C. 154(b) by 193 days.

(21) Appl. No.: 18/394,471

(22) Filed: Dec. 22, 2023

(65) Prior Publication Data

US 2024/0174550 A1　May 30, 2024

Related U.S. Application Data

(63) Continuation of application No. PCT/EP2022/066881, filed on Jun. 21, 2022.

(30) Foreign Application Priority Data

Jun. 22, 2021　(EP) ..................................... 21180891

(51) Int. Cl.
*C03C 3/097*　(2006.01)
*C03C 3/089*　(2006.01)
(Continued)

(52) U.S. Cl.
CPC .............. *C03C 3/097* (2013.01); *C03C 3/089* (2013.01); *C03C 4/20* (2013.01); *C03C 15/00* (2013.01);
(Continued)

(58) Field of Classification Search
CPC ... C03C 15/00; C03C 2204/00; C03C 23/006; C03C 3/087; C03C 3/089; C03C 3/097; C03C 4/20
See application file for complete search history.

(56) References Cited

U.S. PATENT DOCUMENTS 4,366,253 A　12/1982　Yagi
4,390,638 A　6/1983　Mennemann et al.
(Continued)

FOREIGN PATENT DOCUMENTS

DE　10 2005 034 785 B3　1/2007
JP　08-157231 A　6/1996

OTHER PUBLICATIONS

Notification of Transmittal of the International Search Report and the Written Opinion of the International Searching Authority, or the Declaration dated Sep. 20, 2022 for International Application No. PCT/EP2022/066881 (13 pages).
(Continued)

*Primary Examiner* — Lawrence D Ferguson
(74) *Attorney, Agent, or Firm* — TAYLOR & EDELSTEIN, PC

(57)　ABSTRACT

A glass composition includes oxides which form non-volatile fluorides at a temperature of 150° C. and a pressure of 5 Pa or less and are present in an amount of less than 0.5 mol % in the glass composition, based on all oxides present in the glass composition. A working point of the glass composition is 1400° C. or less. The glass composition has a hydrolytic resistance characterized by a leachability of $GeO_2$, $P_2O_5$ and/or $B_2O_3$ from the glass composition determined as concentrations in an eluate prepared according to ISO 719 of at least one of the following: less than 70 mg/l $GeO_2$ in the eluate per 1 mol % $GeO_2$ in the glass composition; less than 70 mg/l $P_2O_5$ in the eluate per 1 mol % $P_2O_5$ in the glass
(Continued)

── Example 4　0.91 mm --- Example 5　0.92 mm

Wavelength (nm)

composition; or less than 300 mg/l $B_2O_3$ in the eluate per 1 mol % $B_2O_3$ in the glass composition.

21 Claims, 2 Drawing Sheets

(51) Int. Cl.
| | | |
|---|---|---|
| | *C03C 4/20* | (2006.01) |
| | *C03C 15/00* | (2006.01) |
| | *C03C 23/00* | (2006.01) |

(52) U.S. Cl.
CPC ........ *C03C 23/006* (2013.01); *C03C 2204/00* (2013.01)

(56)                    References Cited

U.S. PATENT DOCUMENTS

| | | | |
|---|---|---|---|
| 2008/0179294 A1 | 7/2008 | Hayden et al. | |
| 2015/0344350 A1* | 12/2015 | Drake ................... | C03C 21/002 |
| | | | 501/67 |

OTHER PUBLICATIONS

DIN ISO 719, "Glass—Water resistance of glass semolina 98 degC—Test methods and Classifications (ISO 719:2020)", DIN Standards Committee for Medicine (NAMed) DIN Standards Committee for Construction (NABau) DIN Standards Committee for Laboratory Equipment and Facilities (FNLa) (16 pages).
ISO 7991, "Glass—Determination of coefficient of mean linear thermal expansion", International Organization for Standardization, First Edition , Dec. 15, 1987 (12 pages).

* cited by examiner

— Example 6b    1.02 mm

FIG. 2

GLASS COMPOSITION, GLASS ARTICLE AND USE THEREOF

CROSS REFERENCE TO RELATED APPLICATIONS

This is a continuation of International Patent Application No. PCT/EP2022/066881 entitled "GLASS COMPOSITION, GLASS ARTICLE AND USE THEREOF," filed on Jun. 21, 2022, which is incorporated in its entirety herein by reference. International Patent Application No. PCT/EP2022/066881 claims priority to European Patent Application No. 21180891.0 filed on Jun. 22, 2021, which is incorporated in its entirety herein by reference.

BACKGROUND OF THE INVENTION

1. Field of the Invention

The present invention relates to glass compositions, glass articles and their use. The glass compositions are particularly useful and suitable in the context of reactive ion etching applications.

2. Description of the Related Art

In view of the trend towards increased miniaturisation across a broad spectrum of industries, the development of micro-optical and microstructured elements, such as lenses, mirrors and (optical) waveguides, is a very active field of research. Reactive ion etching (RIE) is a known technology suitable for the microstructuring of precursor elements that allows, for example, the manufacture of microstructured SiO2 wafers via a masking technique in a plasma generator.

During the microstructuring process of a pure SiO2 (precursor) product with CF4 or another suitable fluorine-containing gas, volatile tetrafluorosilane is formed, but due to its gaseous state of matter tetrafluorosilane is not deposited on the (precursor) product. Quartz glass, also referred to as vitreous silica, is known for its excellent chemical resistance. Although pure SiO2 glass has many further advantages in the context of RIE microstructuring and can be obtained in a variety of shapes, there are a number of drawbacks. The high melting temperature of SiO2 and the concomitantly high manufacturing temperature, also referred to as working point, comes at high production costs and simultaneous burden for the environment ("carbon dioxide footprint"). Certain desired product geometries can only be obtained in laborious and costly post-processing steps. A further disadvantage during wafer level assembly processes, wherein glass wafers and semiconductor materials are joined, is the small average coefficient of thermal expansion of SiO2 of around 0.5 ppm/K.

Glass compositions with an average coefficient of thermal expansion matching known semiconductor materials, e.g. in a range of 2 to 8 ppm/K, and which can be manufactured into a variety of desired shapes at comparably low cost are hence more desirable.

All commercially available glass compositions which fulfil these desired properties, regarding their geometries, average coefficients of thermal expansion and refractive indices, have the drawback of formation of solid fluorides during RIE, which are consequently deposited on the glass surface immediately after their formation. With the exception of SiO2, most bulk glasses suffer from this drawback because the majority of chemical elements typically found in glass compositions form solid fluorides (at room temperature).

DE 10 2005 034 785 B3 describes glasses whose (oxide) components exclusively form volatile fluorides when reacted with fluorine at room temperature (25° C.). The described glasses can be melted in conventional melting units, such as tanks or crucibles, as their melting temperature is in a range of 1500° C. to 1750° C. and thus well below the melting temperature of SiO2. The described glasses can be produced in various required geometries and have expansion coefficients compatible with silicon. The described glasses are however limited in their chemical resistance and robustness, in particular when subject to manufacturing conditions which are typical for semiconductor processing.

US 2008/0179294 A1 describes glasses whose oxides form non-volatile fluorides at a temperature of 150° C. and a pressure of 5 Pa or less. The glasses described in US 2008/0179294 A1 belong to a group of glasses in which the sum of glass-forming elements Si, B, P and Ge is less than 50 mol %, based on their oxides. Such glass compositions generally have a high tendency to crystallise and are known for their steep viscosity behaviour which makes their production challenging (Calahoo & Wondraczek, Ionic glasses: Structure, properties and classification, J. Non-Crystalline Solids: X 8, 2020, 100054). The glasses described in US 2008/0179294 A1 rely on a high content of B2O3 in order to improve the meltability. However, a high content of B2O3 is detrimental for the chemical resistance of the resulting glasses. Furthermore, B2O3-rich glasses are hygroscopic.

What is needed in the art is a way to overcome the limitations of the glass compositions described in the art.

SUMMARY OF THE INVENTION

In some embodiments provided according to the invention, a glass composition includes oxides which form non-volatile fluorides at a temperature of 150° C. and a pressure of 5 Pa or less and are present in an amount of less than 0.5 mol % in the glass composition, based on all oxides present in the glass composition. A working point of the glass composition is 1400° C. or less. The glass composition has a hydrolytic resistance characterized by a leachability of $GeO_2$, $P_2O_5$ and/or $B_2O_3$ from the glass composition determined as concentrations in an eluate prepared according to ISO 719 of at least one of the following: less than 70 mg/l $GeO_2$ in the eluate per 1 mol % $GeO_2$ in the glass composition; less than 70 mg/l $P_2O_5$ in the eluate per 1 mol % $P_2O_5$ in the glass composition; or less than 300 mg/l $B_2O_3$ in the eluate per 1 mol % $B_2O_3$ in the glass composition.

In some embodiments provided according to the invention, a glass article includes a glass composition that includes oxides which form non-volatile fluorides at a temperature of 150° C. and a pressure of 5 Pa or less and are present in an amount of less than 0.5 mol % in the glass composition, based on all oxides present in the glass composition. A working point of the glass composition is 1400° C. or less. The glass composition has a hydrolytic resistance characterized by a leachability of $GeO_2$, $P_2O_5$ and/or $B_2O_3$ from the glass composition determined as concentrations in an eluate prepared according to ISO 719 of at least one of the following: less than 70 mg/l $GeO_2$ in the eluate per 1 mol % $GeO_2$ in the glass composition; less than 70 mg/l $P_2O_5$ in the eluate per 1 mol % $P_2O_5$ in the glass composition; or less than 300 mg/l $B_2O_3$ in the eluate per 1 mol % $B_2O_3$ in the glass composition. The glass article is at least one of the following: formed as a sheet, a plate, a bar, and/or a flat glass; a surface-structured and/or etched wafer, a surface-structured and/or etched optical wafer, and/or a glass wave-guide panel; a substrate glass for a radio-frequency micro-electromechanical system; or an article structured via reactive ion etching.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

Figure 2:
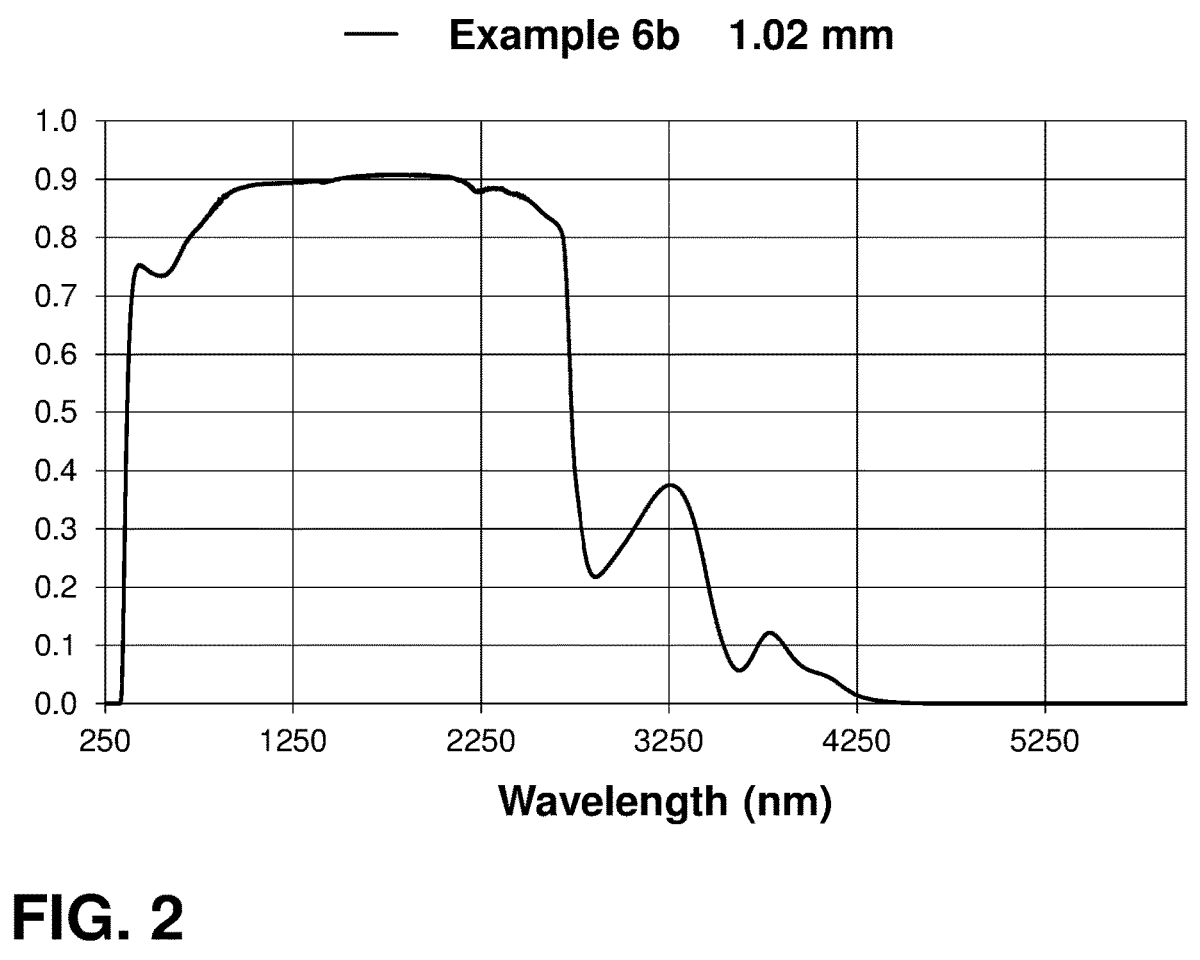

FIG. 2 illustrates a spectral transmission of an embodiment of a glass composition provided according to the invention, designated as Example 6b.

Corresponding reference characters indicate corresponding parts throughout the several views. The exemplifications set out herein illustrate embodiments of the invention (, in one form,) and such exemplifications are not to be construed as limiting the scope of the invention in any manner.

DETAILED DESCRIPTION OF THE INVENTION

Figure 1:
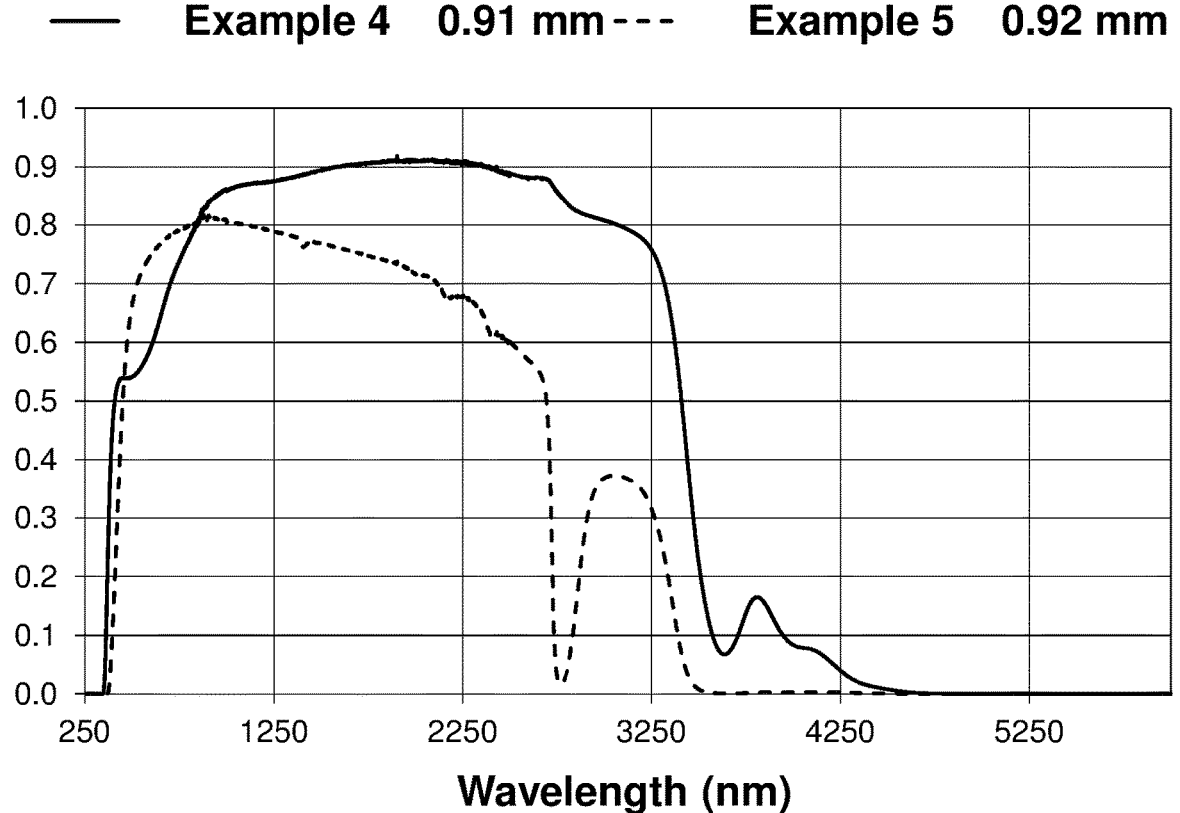
FIG. 1 illustrates spectral transmissions of embodiments of a glass composition provided according to the invention, designated as Examples 4 and 5.

In view of the glass compositions available in the art it is an object of the invention to provide a glass composition which forms volatile fluorides during RIE conditions and which is characterised by both an average coefficient of thermal expansion similar to typical semiconductor materials, such as e.g. silicon and silicon nitride, and a sufficient chemical resistance which meets the standards for similar technical glasses. It is a further object of the invention to provide a glass composition which is suitable for micro-optical and/or microfabrication applications.

In some embodiments, the invention relates to a glass composition, wherein:

a. the working point $V_A$ of the composition is 1400° C. or less, optionally less than 1350° C., optionally less than 1250° C., optionally less than 1100° C.;

b. oxides which form non-volatile fluorides at a temperature of 150° C. and a pressure of 5 Pa or less, optionally during reactive ion etching, such as alkali metal oxides, alkali earth metal oxides and iron oxides, are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition; and c. the composition has a hydrolytic resistance characterized by a leachability of $GeO_2$, $P_2O_5$ and/or $B_2O_3$ from the composition determined as concentrations in an eluate prepared according to ISO 719 of i. less than 70 mg/l $GeO_2$ in the eluate per 1 mol % $GeO_2$ in the glass composition, optionally less than 30 mg/l $GeO_2$, optionally less than 15 mg/l $GeO_2$, and/or ii. less than 70 mg/l $P_2O_5$ in the eluate per 1 mol % $P_2O_5$ in the glass composition, optionally less than 30 mg/l $P_2O_5$, optionally less than 15 mg/l $P_2O_5$, and/or iii. less than 300 mg/l $B_2O_3$ in the eluate per 1 mol % $B_2O_3$ in the glass composition, optionally less than 20 mg/l $B_2O_3$, optionally less than 10 mg/l $B_2O_3$.

In some embodiments, the invention relates to a glass composition, wherein:

a. the working point $V_A$ of the composition is 1400° C. or less, optionally less than 1350° C., optionally less than 1250° C., optionally less than 1100° C.;

b. alkali metal oxides, alkali earth metal oxides and iron oxides are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition; and c. the composition has a hydrolytic resistance characterized by a leachability of $GeO_2$, $P_2O_5$ and/or $B_2O_3$ from the composition determined as concentrations in an eluate prepared according to ISO 719 of i. less than 70 mg/l $GeO_2$ in the eluate per 1 mol % $GeO_2$ in the glass composition, optionally less than 30 mg/l $GeO_2$, optionally less than 15 mg/l $GeO_2$, and/or ii. less than 70 mg/l $P_2O_5$ in the eluate per 1 mol % $P_2O_5$ in the glass composition, optionally less than 30 mg/l $P_2O_5$, optionally less than 15 mg/l $P_2O_5$, and/or iii. less than 300 mg/l $B_2O_3$ in the eluate per 1 mol % $B_2O_3$ in the glass composition, optionally less than 20 mg/l $B_2O_3$, optionally less than 10 mg/l $B_2O_3$.

In some embodiments, the invention relates to a glass composition comprising, based on all oxides present in the glass composition:

a. 10 to 55 mol % $SiO_2$, optionally 40 to 55 mol % $SiO_2$, b. 5 to 30 mol % $B_2O_3$, optionally 10 to 30 mol % $B_2O_3$, c. 5 to 30 mol % $P_2O_5$, optionally 10 to 18 mol % $P_2O_5$, d. 5 to 30 mol % $GeO_2$, optionally 10 to 18 mol % $GeO_2$, and e. at least 2 mol % $TiO_2$ and/or at least 2 mol % $Nb_2O_5$, optionally at least 4 mol % $TiO_2$ and/or at least 4 mol % $Nb_2O_5$, wherein the sum of $B_2O_3$, $P_2O_5$, $GeO_2$, $TiO_2$ and $Nb_2O_5$ is at least 35 mol %, optionally at least 37 mol %, optionally at least 39 mol %, optionally at least 41 mol %, optionally at least 43 mol %, optionally at least 45 mol %, and wherein the sum of $B_2O_3$ and $P_2O_5$ is less than 35 mol %.

In some embodiments, the invention relates to a glass composition comprising, based on all oxides present in the glass composition:

a. 10 to 55 mol % $SiO_2$, optionally 40 to 55 mol % $SiO_2$, b. 5 to 30 mol % $B_2O_3$, optionally 10 to 30 mol % $B_2O_3$, c. 5 to 30 mol % $P_2O_5$, optionally 10 to 18 mol % $P_2O_5$, d. 5 to 30 mol % $GeO_2$, optionally 10 to 18 mol % $GeO_2$, and e. at least 2 mol % $TiO_2$ and/or at least 2 mol % $Nb_2O_5$, optionally at least 4 mol % $TiO_2$ and/or at least 4 mol % $Nb_2O_5$, wherein the sum of $B_2O_3$, $P_2O_5$, $GeO_2$, $TiO_2$ and $Nb_2O_5$ is at least 35 mol %, optionally at least 37 mol %, optionally at least 39 mol %, optionally at least 41 mol %, optionally at least 43 mol %, optionally at least 45 mol %, wherein the sum of $B_2O_3$ and $P_2O_5$ is less than 35 mol %, wherein alkali metal oxides, alkali earth metal oxides and iron oxides are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition.

In some embodiments, the invention relates to a glass article comprising the composition provided according to the invention, wherein the article is a. formed as a sheet, a plate, or a bar, being e.g. a flat glass, and/or b. a surface-structured and/or etched wafer, optionally a surface-structured and/or etched optical wafer, optionally a glass waveguide panel, and/or c. a substrate glass for RF-MEMS (radio-frequency microelectromechanical system), and/or d. an article structured via reactive ion etching (RIE), optionally the article is a wafer structured via RIE.

In some embodiments, the invention relates to a use of a glass composition provided according to the invention or a use of a glass article provided according to the invention in a microstructuring process, wherein optionally the microstructuring process is reactive ion etching.

In some embodiments, the invention relates to a method for the production of a glass composition comprising the steps of melting the glass composition, specifically melting a batch of raw materials yielding the oxides comprised in the glass composition; establishing and/or maintaining conditions during the melting step which prevent the chemical reduction of redox-active species, optionally maintaining oxidising conditions; optionally forming, e.g. down-drawing, or casting the molten glass composition; and optionally cold reworking of the glass composition into wafers.

Glass Composition

In some embodiments, the invention relates to a glass composition, wherein:

a. the working point $V_A$ of the composition is 1400° C. or less, optionally less than 1350° C., optionally less than 1250° C., optionally less than 1100° C.;

b. oxides which form non-volatile fluorides at a temperature of 150° C. and a pressure of 5 Pa or less, optionally during reactive ion etching, such as alkali metal oxides, alkali earth metal oxides and iron oxides, are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition; and c. the composition has a hydrolytic resistance characterized by a leachability of $GeO_2$, $P_2O_5$ and/or $B_2O_3$ from the composition determined as concentrations in an eluate prepared according to ISO 719 of i. less than 70 mg/l $GeO_2$ in the eluate per 1 mol % $GeO_2$ in the glass composition, optionally less than 30 mg/l $GeO_2$, optionally less than 15 mg/l $GeO_2$, and/or ii. less than 70 mg/l $P_2O_5$ in the eluate per 1 mol % $P_2O_5$ in the glass composition, optionally less than 30 mg/l $P_2O_5$, optionally less than 15 mg/l $P_2O_5$, and/or iii. less than 300 mg/l $B_2O_3$ in the eluate per 1 mol % $B_2O_3$ in the glass composition, optionally less than 20 mg/l $B_2O_3$, optionally less than 10 mg/l $B_2O_3$.

The glass compositions provided according to the invention can advantageously be melted in conventional melting units due to their working point $V_A$. The working point $V_A$ is the temperature at which the compositions have a viscosity of $10^4$ dPas. In some embodiments, the working point $V_A$ of the composition is 1400° C. or less, optionally less than 1350° C., optionally less than 1250° C., optionally less than 1100° C. In some embodiments, the working point $V_A$ of the composition is 700° C. or more, optionally 800° C. or more, optionally 900° C. or more, optionally 1000° C. or more. In some embodiments, the working point $V_A$ of the composition is from 700° C. to 1400° C., optionally from 800° C. to 1350° C., optionally from 900° C. to 1250° C., optionally from 1000° C. to 1100° C. In comparison, the working point $V_A$ of $SiO_2$ is around 2350° C. The viscosity can be measured using a rotational viscosimeter, e.g. described in DIN ISO 7884-2:1998-2. The dependence of the viscosity on the temperature is determined according to the Vogel-Fulcher-Tammann (VFT) equation.

During reactive ion etching (RIE), a glass or silicon sample target is placed in a reactor system and the system is evacuated. Subsequently, a reactive gas usually containing fluorine or related compounds is introduced into the reactor system. A radiofrequency discharge created in the vicinity of the target provides a reactive plasma of fluorine atoms which react with the constituents of the glass composition. Elemental oxides are thus converted into their respective fluorides. Provided that the obtained fluorides are sufficiently volatile, they can be removed from the reactor system e.g. by means of a vacuum pump or another way of flow through the reactor system at a sufficiently reduced pressure.

The skilled person is aware that alkali metal oxides, alkali earth metal oxides and iron oxides form non-volatile fluorides during RIE. It is also known that starting materials for the manufacture of a glass composition often contain trace amounts of undesired components, such as, in the present case, alkali metal oxides, alkali earth metal oxides and iron oxides. It is often cumbersome and costly to provide starting materials for the manufacture of a glass composition which are completely devoid of such undesired components. The skilled person further knows that the manufacturing conditions, such as the crucible, can introduce trace amounts of undesired components. Hence, in glass compositions provided according to the invention oxides which form non-volatile fluorides at a temperature of 150° C. and a pressure of 5 Pa or less, optionally during reactive ion etching, such as alkali metal oxides, alkali earth metal oxides and iron oxides, are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition.

In the context of the present invention, alkali metal oxides are meant to include specifically $Li_2O$, $Na_2O$, $K_2O$, $Rb_2O$ and $Cs_2O$ and alkali earth metal oxides are meant to include specifically BeO, MgO, CaO, BaO und SrO.

Different technical standards have been described to characterise the chemical resistance of a glass composition. The known DIN 12116 and ISO 695 involve harsh chemical conditions which are not suitable in the context of the present invention. Instead, the hydrolytic resistance was determined based on an eluate prepared according to ISO 719. Because the underlying glass compositions provided according to the invention are (exclusively) based on acid anhydrides, such as e.g. $P_2O_5$, and amphoteric oxides, such as e.g. $GeO_2$, the typical analysis of the ISO 719 norm can however not be employed in the present case.

Usually, glass compositions contain alkali ions and alkali earth ions which render the eluate obtained according to ISO 719 alkaline, i.e. the aqueous solution has a pH>7.0, allowing for subsequent neutralisation and quantification by HCl titration. The hydrolytic resistance is then normally quantified by the reacted amount of hydrochloric acid solution. Instead, for the glass compositions provided according to the invention, the eluate obtained according to ISO 719 is not titrated, but analysed by ICP-OES with respect to the dissolved, or leached, components, i.e. $SiO_2$, $GeO_2$, $P_2O_5$ and $B_2O_3$. The raw data for the hydrolytic resistance characterized by the leachability parameter are given in mg/l for each of the four analysed $SiO_2$, $GeO_2$, $P_2O_5$ and $B_2O_3$ species, if present in the investigated glass composition.

The glass composition provided according to the invention has a hydrolytic resistance characterized by a leachability of $GeO_2$, $P_2O_5$ and/or $B_2O_3$ from the composition determined as concentrations in an eluate prepared according to ISO 719 of i. less than 70 mg/l $GeO_2$ in the eluate per 1 mol % $GeO_2$ in the glass composition, optionally less than 30 mg/l $GeO_2$, optionally less than 15 mg/l $GeO_2$, and/or ii. less than 70 mg/l $P_2O_5$ in the eluate per 1 mol % $P_2O_5$ in the glass composition, optionally less than 30 mg/l $P_2O_5$, optionally less than 15 mg/l $P_2O_5$, and/or iii. less than 300 mg/l $B_2O_3$ in the eluate per 1 mol % $B_2O_3$ in the glass composition, optionally less than 150 mg/l $B_2O_3$, optionally less than 50 mg/l $B_2O_3$, optionally less than 20 mg/l $B_2O_3$, optionally less than 10 mg/l $B_2O_3$.

In some embodiments, the glass composition has a hydrolytic resistance characterized by a leachability of $GeO_2$, $P_2O_5$ and/or $B_2O_3$ from the composition determined as concentrations in an eluate prepared according to ISO 719 of i. less than 30 mg/l $GeO_2$, and/or ii. less than 30 mg/l $P_2O_5$, and/or iii. less than 50 mg/l $B_2O_3$.

In some embodiments, the glass composition has a hydrolytic resistance characterized by a leachability of $GeO_2$, $P_2O_5$ and/or $B_2O_3$ from the composition determined as concentrations in an eluate according to ISO 719 of i. less than 15 mg/l $GeO_2$, and/or ii. less than 15 mg/l $P_2O_5$, and/or iii. less than 10 mg/l $B_2O_3$.

In some embodiments, the glass composition has a hydrolytic resistance characterized by a leachability of $GeO_2$, $P_2O_5$ and/or $B_2O_3$ from the composition determined as concentrations in an eluate prepared according to ISO 719 of i. at least 1 mg/l $GeO_2$, and/or ii. at least 1 mg/l $P_2O_5$, and/or iii. at least 1 mg/l $B_2O_3$.

In some embodiments, the glass composition has a hydrolytic resistance characterized by a leachability of $GeO_2$, $P_2O_5$ and/or $B_2O_3$ from the composition determined as concentrations in an eluate prepared according to ISO 719 of i. at least 3 mg/l $GeO_2$, and/or ii. at least 3 mg/l $P_2O_5$, and/or iii. at least 2 mg/l $B_2O_3$.

In some embodiments, the glass composition comprises, based on all oxides present in the glass composition, at least 2 mol % $TiO_2$ and/or at least 2 mol % $Nb_2O_5$, optionally at least 4 mol % $TiO_2$ and/or at least 4 mol % $Nb_2O_5$. The inventors have shown that the presence of $TiO_2$ and/or $Nb_2O_5$ in the glass composition, in replacement of part of the $GeO_2$ content, contributes to an improved chemical resistance. Such an improved chemical resistance can, for example, be proven via the above-described modified ISO 719 method which analyses the leachability of $GeO_2$, $P_2O_5$ and $B_2O_3$ from the composition by way of titration.

In some embodiments, the glass composition comprises, based on all oxides present in the glass composition, 5 to 30 mol % $GeO_2$, optionally 10 to 18 mol % $GeO_2$. $GeO_2$ is a component that can advantageously lower the viscosity of the glass composition.

In some embodiments, the glass composition is essentially free of alkali metal oxides and alkali earth metal oxides. During RIE alkali metal oxides and alkali earth metal oxides form non-volatile fluorides, which deteriorate the glass composition as such, and in particular also any technical elements or products manufactured from the glass composition.

If this description refers to raw materials or a glass composition which is essentially free of a component or does not contain a certain component, or includes the hypothetical case of 0 mol % of that component, it is to be understood that this component may at most be present as an impurity. This means that it is not added in significant quantities and that it is not added intentionally. The term component refers to the elemental species as such as well as any molecule containing the element. Non-essential amounts are to be understood as less than 0.5 mol % in the composition, less than 0.3 mol %, less than 0.2 mol %, less than 0.1 mol %, less than 0.05 mol %, less than 0.025 mol %, less than 0.01 mol %, less than 0.005 mol %, or less than 0.001 mol %, based on the mole percentage with respect to all intentionally added components.

In some embodiments, the glass compositions described herein are free from components not mentioned.

In some embodiments, the glass composition comprises, based on all oxides present in the glass composition, a. 10 to 55 mol % $SiO_2$, optionally 40 to 55 mol % $SiO_2$, b. 5 to 30 mol % $B_2O_3$, optionally 10 to 30 mol % $B_2O_3$, c. 5 to 30 mol % $P_2O_5$, optionally 10 to 18 mol % $P_2O_5$, wherein the sum of $B_2O_3$, $P_2O_5$, $GeO_2$, $TiO_2$ and $Nb_2O_5$ is at least 35 mol %, optionally at least 37 mol %, optionally at least 39 mol %, optionally at least 41 mol %, optionally at least 43 mol %, optionally at least 45 mol %, and wherein the sum of $B_2O_3$ and $P_2O_5$ is less than 35 mol %.

In some embodiments, the glass composition comprises, based on all oxides present in the glass composition, a. 40 to 55 mol % $SiO_2$, b. 10 to 30 mol % $B_2O_3$, c. 10 to 18 mol % $P_2O_5$, wherein the sum of $B_2O_3$, $P_2O_5$, $GeO_2$, $TiO_2$ and $Nb_2O_5$ is at least 45 mol %, and wherein the sum of $B_2O_3$ and $P_2O_5$ is less than 35 mol %.

In some embodiments, the glass composition comprises, based on all oxides present in the glass composition, 40 to 55 mol % $SiO_2$, 10 to 30 mol % $B_2O_3$, 10 to 18 mol % $P_2O_5$, wherein the sum of $B_2O_3$, $P_2O_5$, $GeO_2$, $TiO_2$ and $Nb_2O_5$ is at least 45 mol % but not more than 60 mol %, and wherein the sum of $B_2O_3$ and $P_2O_5$ is at least 20 mol % and less than 35 mol %.

In some embodiments, the glass composition comprises, based on all oxides present in the glass composition, 45 to 55 mol % $SiO_2$, 10 to 20 mol % $B_2O_3$, 10 to 18 mol % $P_2O_5$, wherein the sum of $B_2O_3$, $P_2O_5$, $GeO_2$, $TiO_2$ and $Nb_2O_5$ is at least 45 mol % but not more than 55 mol %, and wherein the sum of $B_2O_3$ and $P_2O_5$ is at least 25 mol % and less than 35 mol %.

In some embodiments, the glass composition comprises, based on all oxides present in the glass composition, 10 to 55 mol % $SiO_2$, optionally 40 to 55 mol % $SiO_2$, optionally 45 to 55 mol % $SiO_2$, optionally 50 to 55 mol % $SiO_2$, and optionally 52 to 55 mol % $SiO_2$. In some embodiments, the glass composition comprises, based on all oxides present in the glass composition, at least 10 mol % $SiO_2$, optionally at least 40 mol % $SiO_2$, optionally at least 45 mol % $SiO_2$, optionally at least 50 mol % $SiO_2$, and optionally at least 52 mol % $SiO_2$. In some embodiments, the glass composition comprises, based on all oxides present in the glass composition, 55 mol % $SiO_2$ or less.

In some embodiments, the glass composition comprises, based on all oxides present in the glass composition, 5 to 30 mol % $B_2O_3$, optionally 10 to 30 mol % $B_2O_3$, optionally 10 to 20 mol % $B_2O_3$, optionally 12 to 18 mol % $B_2O_3$, and optionally 14 to 16 mol % $B_2O_3$. In some embodiments, the glass composition comprises, based on all oxides present in the glass composition, at least 5 mol % $B_2O_3$, optionally at least 10 mol % $B_2O_3$, optionally at least 12 mol % $B_2O_3$, and optionally at least 14 mol % $B_2O_3$. In some embodiments, the glass composition comprises, based on all oxides present in the glass composition, 30 mol % $B_2O_3$ or less, optionally 25 mol % $B_2O_3$ or less, optionally 20 mol % $B_2O_3$ or less, optionally 18 mol % $B_2O_3$ or less, and optionally 16 mol % $B_2O_3$ or less.

In some embodiments, the glass composition comprises, based on all oxides present in the glass composition, 5 to 30 mol % $P_2O_5$, optionally 10 to 18 mol % $P_2O_5$, optionally 12 to 18 mol % $P_2O_5$, and optionally 14 to 16 mol % $P_2O_5$. In some embodiments, the glass composition comprises, based on all oxides present in the glass composition, at least 5 mol % $P_2O_5$, optionally at least 10 mol % $P_2O_5$, optionally at least 12 mol % $P_2O_5$, and optionally at least 14 mol % $P_2O_5$. In some embodiments, the glass composition comprises, based on all oxides present in the glass composition, 30 mol % $P_2O_5$ or less, optionally 25 mol % $P_2O_5$ or less, optionally 18 mol % $P_2O_5$ or less, and optionally 16 mol % $P_2O_5$ or less.

In some embodiments, the glass composition comprises, based on all oxides present in the glass composition, 3 to 40 mol % $GeO_2$, optionally 5 to 30 mol % $GeO_2$, optionally 10 to 25 mol % $GeO_2$, optionally 10 to 18 mol % $GeO_2$, and optionally 13 to 17 mol % $GeO_2$. In some embodiments, the glass composition comprises, based on all oxides present in the glass composition, at least 5 mol % $GeO_2$, optionally at least 10 mol % $GeO_2$, optionally at least 11.5 mol % $GeO_2$, and optionally at least 13 mol % $GeO_2$. In some embodiments, the glass composition comprises, based on all oxides present in the glass composition, 40 mol % $GeO_2$ or less, 30 mol % $GeO_2$ or less, optionally 25 mol % $GeO_2$ or less, optionally 18 mol % $GeO_2$ or less, and optionally 17 mol % $GeO_2$ or less.

In some embodiments, the glass composition comprises, based on all oxides present in the glass composition, at least 2 mol % $TiO_2$ and/or at least 2 mol % $Nb_2O_5$, optionally at least 4 mol % $TiO_2$ and/or at least 4 mol % $Nb_2O_5$. In some embodiments, the glass composition comprises, based on all oxides present in the glass composition, 2 to 15 mol % $TiO_2$, optionally 4 to 11 mol % $TiO_2$. In some embodiments, the glass composition comprises, based on all oxides present in the glass composition, 15 mol % $TiO_2$ or less, optionally 11 mol % $TiO_2$ or less. In some embodiments, the glass composition comprises, based on all oxides present in the glass composition, 2 to 15 mol % $Nb_2O_5$, optionally 4 to 11 mol % $Nb_2O_5$, optionally 4 to 8 mol % $Nb_2O_5$, and optionally 4 to 6 mol % $Nb_2O_5$. In some embodiments, the glass composition comprises, based on all oxides present in the glass composition, 15 mol % $Nb_2O_5$ or less, optionally 11 mol % $Nb_2O_5$ or less, optionally 8 mol % $Nb_2O_5$ or less, and optionally 6 mol % $Nb_2O_5$ or less.

In some embodiments, the glass composition comprises a total sum of $B_2O_3$, $P_2O_5$, $GeO_2$, $TiO_2$ and $Nb_2O_5$, based on all oxides present in the glass composition, of at least 35 mol %, optionally at least 37 mol %, optionally at least 39 mol %, optionally at least 41 mol %, optionally at least 43 mol %, optionally at least 45 mol %, but not more than 55 mol %, optionally not more than 53 mol %, optionally not more than 51 mol %, optionally not more than 49 mol %, optionally not more than 47 mol %.

In some embodiments, the glass composition comprises a total sum of $B_2O_3$, $P_2O_5$, $GeO_2$, $TiO_2$ and $Nb_2O_5$, based on all oxides present in the glass composition, from 35 to 55 mol %, optionally 37 to 53 mol %, optionally 39 to 51 mol %, optionally 41 to 49 mol %, optionally 43 to 47 mol %. In some embodiments, the glass composition comprises a total sum of $B_2O_3$, $P_2O_5$, $GeO_2$, $TiO_2$ and $Nb_2O_5$, based on all oxides present in the glass composition, of at least 35 mol %, optionally at least 37 mol %, optionally at least 39 mol %, optionally at least 41 mol %, optionally at least 43 mol %. In some embodiments, the glass composition comprises a total sum of $B_2O_3$, $P_2O_5$, $GeO_2$, $TiO_2$ and $Nb_2O_5$, based on all oxides present in the glass composition, of 55 mol % or less, optionally 53 mol % or less, optionally 51 mol % or less, optionally 49 mol % or less, optionally 47 mol % or less.

In some embodiments, the glass composition comprises a total sum of $B_2O_3$ and $P_2O_5$, based on all oxides present in the glass composition, of less than 35 mol %, optionally at least 20 mol % and less than 35 mol %, optionally at least 25 mol % and less than 35 mol %, and optionally at least 28 mol % and less than 32 mol %.

$B_2O_3$ and $P_2O_5$ are both components that can advantageously lower the viscosity of the glass composition. Simultaneously, these two components also reduce the chemical resistance of the glass composition. This effect may be mitigated by providing boron and phosphorous at least partially in the form of the species $BPO_4$, i.e. in an equal molarity. A minimum amount of 5 mol % $B_2O_3$ and 5 mol % $P_2O_5$ is useful to sufficiently reduce the viscosity of the glass composition. In view of the chemical resistance, the sum of $B_2O_3$ and $P_2O_5$ in the glass composition can optionally be less than 35 mol %. If the chemical resistance is reduced to a great extent, machining and cleaning processes may become difficult.

In some embodiments, the glass composition has a molar ratio between $B_2O_3$ and $P_2O_5$ of from 1:2 to 2:1, optionally from 1:1.5 to 1.5:1, optionally from 1:1.1 to 1.1:1. Such a molar ratio between $B_2O_3$ and $P_2O_5$ mitigates the undesirable effects of the reduction in chemical resistance. If one component is present in strong excess over the other component, the chemical resistance deteriorates. For example, excess $B_2O_3$ in the glass composition leads to more hygroscopic glasses.

In some embodiments, the glass composition comprises exclusively oxides which form volatile fluorides at a temperature of 150° C. and a pressure of 5 Pa or less, optionally during reactive ion etching. The exclusion of oxides which form volatile fluorides at these conditions is beneficial and assists in obtaining trenches on the surface of a glass article, wherein the aspect ratio of the trench depth to the width is at least 5:1, optionally at least 7:1.

In some embodiments, the glass composition has an average coefficient of thermal expansion, measured according to DIN ISO 7991:1987 in the temperature range of 20° C. to 300° C., of from 1 to 6 ppm/K, optionally from 2 to 5 ppm/K, optionally from 2.5 to 3 ppm/K, or alternatively optionally from 3 to 6 ppm/K, optionally from 3 to 5 ppm/K, optionally from 3 to 4 ppm/K, optionally from 3 to 3.5 ppm/K.

Matching the thermal expansion of the glass composition to common semiconductors assists in the manufacturing of optical devices using integrated circuit manufacturing technologies because the optical assemblies can now be directly bonded to the semiconductor, allowing the further reduction of the potential size of the obtained optical devices.

In some embodiments, the loss angle measured by impedance spectroscopy at the glass composition is less than 0.005 at 5 GHz, less than 0.0045, less than 0.004, less than 0.0035, less than 0.003, less than 0.0025, less than 0.002, less than 0.0015. In some embodiments, the loss angle measured by impedance spectroscopy at the glass composition is at least 0.0001.

In some embodiments, the dielectric constant is higher than 4.5 at 5 GHz, higher than 5.0, higher than 5.5, higher than 6.0, higher than 6.5, higher than 7.0, higher than 7.5, higher than 8.0. In some embodiments, the dielectric constant is less than 20.0 at 5 GHz. The measurement temperature is room temperature. The measurement can be carried out with a Split Post Dielectric Resonator (SPDR) designed for 5 GHz and manufactured by QWED. A suitable network analyser manufacturer is Rohde & Schwarz.

In some embodiments, the glass composition has a refractive index np of more than 1.5, more than 1.55, more than 1.6, more than 1.65, more than 1.7, more than 1.75, more than 1.8, more than 1.85, more than 1.9, more than 1.95, more than 2.0, more than 2.05, more than 2.1, more than 2.15, and more than 2.2. In some embodiments, the glass composition has a refractive index np of less than 2.5, less than 2.4, and less than 2.3.

In some embodiments, the glass composition has a refractive index $n_D$ of between 1.45 and 1.80, between 1.49 and 1.70, and between 1.49 and 1.59.

In some embodiments, the glass composition has an Abbe number of at least 45, optionally at least 50, optionally at least 55, optionally at least 60. In some embodiments, the glass composition has an Abbe number of 80 or less, optionally 75 or less, optionally 70 or less, optionally 65 or less. For optical applications, and micro-optical applications in particular, it is generally desirable to minimise dispersion, i.e. the change of refractive index versus light wavelength, and related chromatic effects.

In some embodiments, the invention relates to a glass composition comprising or consisting of, based on all oxides present in the glass composition, a. 10 to 55 mol % $SiO_2$, optionally 40 to 55 mol % $SiO_2$,
b. 5 to 30 mol % $B_2O_3$, optionally 10 to 30 mol % $B_2O_3$,
c. 5 to 30 mol % $P_2O_5$, optionally 10 to 18 mol % $P_2O_5$,
d. 5 to 30 mol % $GeO_2$, optionally 10 to 18 mol % $GeO_2$, and
e. at least 2 mol % $TiO_2$ and/or at least 2 mol % $Nb_2O_5$, optionally at least 4 mol % $TiO_2$ and/or at least 4 mol % $Nb_2O_5$,
wherein the sum of $B_2O_3$, $P_2O_5$, $GeO_2$, $TiO_2$ and $Nb_2O_5$ is at least 35 mol %, optionally at least 37 mol %, optionally at least 39 mol %, optionally at least 41 mol %, optionally at least 43 mol %, optionally at least 45 mol %,
and wherein the sum of $B_2O_3$ and $P_2O_5$ is less than 35 mol %.

In some embodiments, the invention relates to a glass composition consisting essentially of, based on all oxides present in the glass composition, a. 10 to 55 mol % $SiO_2$, optionally 40 to 55 mol % $SiO_2$,
b. 5 to 30 mol % $B_2O_3$, optionally 10 to 30 mol % $B_2O_3$,
c. 5 to 30 mol % $P_2O_5$, optionally 10 to 18 mol % $P_2O_5$,
d. 5 to 30 mol % $GeO_2$, optionally 10 to 18 mol % $GeO_2$, and
e. at least 2 mol % $TiO_2$ and/or at least 2 mol % $Nb_2O_5$, optionally at least 4 mol % $TiO_2$ and/or at least 4 mol % $Nb_2O_5$, wherein the sum of $B_2O_3$, $P_2O_5$, $GeO_2$, $TiO_2$ and $Nb_2O_5$ is at least 35 mol %, optionally at least 37 mol %, optionally at least 39 mol %, optionally at least 41 mol %, optionally at least 43 mol %, optionally at least 45 mol %,
and wherein the sum of $B_2O_3$ and $P_2O_5$ is less than 35 mol %.

In some embodiments, the invention relates to a glass composition consisting of in total at least 90 mol %, optionally at least 95 mol %, optionally at least 99 mol % of the following oxides, based on all oxides present in the glass composition, a. 10 to 55 mol % $SiO_2$, optionally 40 to 55 mol % $SiO_2$,
b. 5 to 30 mol % $B_2O_3$, optionally 10 to 30 mol % $B_2O_3$,
c. 5 to 30 mol % $P_2O_5$, optionally 10 to 18 mol % $P_2O_5$,
d. 5 to 30 mol % $GeO_2$, optionally 10 to 18 mol % $GeO_2$, and
e. at least 2 mol % $TiO_2$ and/or at least 2 mol % $Nb_2O_5$, optionally at least 4 mol % $TiO_2$ and/or at least 4 mol % $Nb_2O_5$,
wherein the sum of $B_2O_3$, $P_2O_5$, $GeO_2$, $TiO_2$ and $Nb_2O_5$ is at least 35 mol %, optionally at least 37 mol %, optionally at least 39 mol %, optionally at least 41 mol %, optionally at least 43 mol %, optionally at least 45 mol %,
and wherein the sum of $B_2O_3$ and $P_2O_5$ is less than 35 mol %.

In some embodiments, the invention relates to a glass composition comprising, based on all oxides present in the glass composition, a. 10 to 55 mol % $SiO_2$, optionally 40 to 55 mol % $SiO_2$,
b. 5 to 30 mol % $B_2O_3$, optionally 10 to 30 mol % $B_2O_3$,
c. 5 to 30 mol % $P_2O_5$, optionally 10 to 18 mol % $P_2O_5$,
d. 5 to 30 mol % $GeO_2$, optionally 10 to 18 mol % $GeO_2$, and
e. at least 2 mol % $TiO_2$ and/or at least 2 mol % $Nb_2O_5$, optionally at least 4 mol % $TiO_2$ and/or at least 4 mol % $Nb_2O_5$,
wherein the sum of $B_2O_3$, $P_2O_5$, $GeO_2$, $TiO_2$ and $Nb_2O_5$ is at least 35 mol %, optionally at least 37 mol %, optionally at least 39 mol %, optionally at least 41 mol %, optionally at least 43 mol %, optionally at least 45 mol %,
wherein the sum of $B_2O_3$ and $P_2O_5$ is less than 35 mol %,
alkali metal oxides, alkali earth metal oxides and iron oxides are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition.

It may be preferred that the molar ratio between $B_2O_3$ and $P_2O_5$ is from 1:2 to 2:1, optionally from 1:1.5 to 1.5:1, optionally from 1:1.1 to 1.1:1.

In some embodiments, the total amount of $Ti_2O_3$ and TiO in the glass composition is less than 0.5 mol %, optionally less than 0.2 mol %, optionally less than 0.1 mol %, optionally less than 0.05 mol %, optionally less than 0.02 mol %, optionally less than 0.01 mol %, and/or the total amount of $NbO_2$ and NbO in the glass composition is less than 0.5 mol %, optionally less than 0.2 mol %, optionally less than 0.1 mol %, optionally less than 0.05 mol %, optionally less than 0.02 mol %, optionally less than 0.01 mol %, based on all oxides present in the glass composition.

For applications in the visible wavelength range of the electromagnetic spectrum, e.g. between 400 and 800 nm, it may be desirable that titanium is present in the oxidation state '+4' and that niobium is present in the oxidation state '+5'. Redox-chemical reduction of even small amounts of $TiO_2$ and $Nb_2O_5$ leads to an undesired color change of the glass compositions. This phenomenon usually occurs at the high temperatures during melting of the raw materials and is the result of a thermodynamic entropy effect which favors the generation of additional, small and/or gaseous species, such as $O_2$, e.g. via the following reaction: $2 \; TiO_2 \rightarrow Ti_2O_3 + O_2$.

All reduced species of Ti and Nb are active and can be identified by ESR (electron spin resonance). $Ti^{4+}$ has fully occupied 3s and 3p orbitals and is hence not identifiable by ESR. $Ti^{3+}$ possesses an additional 4s-electron and is therefore identifiable by ESR. $Nb^{5+}$ has fully occupied 4s and 4p orbitals and also fully occupied 3 d orbitals, and is thus not ESR-active. $Nb^{4+}$ possesses an additional 5s-electron and is therefore identifiable by ESR. $Nb^{2+}$ possesses two 5s-electrons and one 4d-electron and is therefore identifiable by ESR. ESR is therefore suitable to identify and discriminate between the desired fully oxidised $Ti^{4+}$ and $Nb^{5+}$ species from the undesired partially reduced Ti and Nb species. The amounts of $Ti^{3+}$, $Nb^{2+}$ and $Nb^{4+}$ in a glass composition can be quantified; see for example Hubertus Braun, Titanate-based paraelectric glass-ceramics for applications in GHz electronics, Dissertation at the Faculty of Physics, Mathematics and Informatics, Johannes Gutenberg-University in Mainz, January 2015, pages 66 and 67 (section 3.7), page 108 (section 4.2.1).

ESR measurements are typically carried out at the boiling point of liquid nitrogen (77K). The measurements are non-destructive and do not require large amounts of material, i.e. less than 100 mg. ESR is advantageous over other spectroscopic techniques because basic glass matrix components, i.e. $SiO_2$, $B_2O_3$, $Al_2O_3$ and $P_2O_5$ consist of oxides with paired electrons which are not ESR-active. ESR is a very sensitive technique and allows estimation of $Ti^{3+}$ amounts of even less than 100 ppm. ESR measurements can e.g. be performed using a MiniScope MS100 (Magnettech) EPR spectrometer.

In some embodiments, the glass composition has an optical transmission of at least 50%, optionally at least 60%, optionally at least 70%, optionally at least 80%, measured over a wavelength range of 400 to 800 nm, and at a glass thickness of 1 mm. In other words, if a glass plate is produced from the glass composition, wherein the glass plate sample has a plate thickness of 1 mm, the glass plate has an optical transmission of at least 50%, optionally at least 60%, optionally at least 70%, optionally at least 80%, measured over a wavelength range of 400 to 2500 nm. The absence of $Ti^{3+}$ and $Nb^{2+/4+}$ species provides a desirable optical transmission in the visible wavelength range of the electromagnetic spectrum, e.g. between 400 and 800 nm.

In some embodiments, the glass composition has a density of less than 2.50 g cm$^{-3}$. In some embodiments, the glass composition has a density of at least 2.10 g cm$^{-3}$, optionally at least 2.20 g cm$^{-3}$, optionally at least 2.30 g cm$^{-3}$.

Glass Article

In some embodiments, the invention relates to a glass article comprising the composition provided according to the invention, wherein the article is a. formed as a sheet, a plate, or a bar, being e.g. a flat glass, and/or b. a surface-structured and/or etched wafer, optionally a surface-structured and/or etched optical wafer, optionally a glass waveguide panel, and/or c. a substrate glass for RF-MEMS (radio-frequency microelectromechanical system), and/or d. an article structured via reactive ion etching (RIE), optionally the article is a wafer structured via RIE.

The glass compositions provided according to the invention are very suitable for manufacturing processes in which microstructures are formed in a glass article comprising the composition, in particular when reactive ion etching is used. Glass compositions provided according to the invention have a higher RIE etching rate than $SiO_2$, i.e. the etching rate was higher by a factor of at least 2 or at least 3, based on a plasma gas of $CF_4$ or $SF_6$, respectively.

In some embodiments, the glass article has one or more of the following properties:

a. the difference of the average coefficient of thermal expansion of the article and polycrystalline silicon is less than 1.0 ppm/K, optionally less than 0.5 ppm/K, optionally less than 0.2 ppm/K, optionally less than 0.1 ppm/K, measured according to DIN ISO 7991:1987 in the temperature range of 20° C. to 300° C., b. a surface roughness, measured according to ISO 25178: 2010-2020, of 100 nm or less, optionally 50 nm or less, optionally 30 nm or less, optionally 10 nm or less, c. trenches on the surface, wherein the aspect ratio of the trench depth to the width is at least 5:1, optionally at least 7:1, d. an etch rate of 0.03 μm min$^{-1}$ or more, determined in an etch rate test using $CHF_3/O_2$-plasma (97.5 vol. %/2.5 vol. %) at 700 eV, at 200 μA cm$^{-2}$, at an ion incidence angle of 0°, using an ion beam etch apparatus ISA150 with a 6"-Kaufman ion beam source with neutralisation, e. provided that the article is a wafer with thickness >0.2 mm, a warp of 200 μm or less, according to ASTM F657:1999.

It may be preferred that the glass article has an average coefficient of thermal expansion which is very similar to polycrystalline silicon, such that the difference of the average coefficient of thermal expansion of the article and polycrystalline silicon is less than 1.0 ppm/K, optionally less than 0.5 ppm/K, optionally less than 0.2 ppm/K, optionally less than 0.1 ppm/K, measured according to DIN ISO 7991:1987 in the temperature range of 20° C. to 300° C. This is particularly advantageous for microstructure applications when glass articles are formed on e.g. silicon wafers to avoid mechanical stress, strain and potential cracks during possible temperature changes.

It may be further advantageous to minimise the surface roughness, measured according to ISO 25178:2010-2020, to 100 nm or less, optionally 50 nm or less, optionally 30 nm or less, optionally 10 nm or less, in order to reduce diffuse scattering and to avoid related types of optical aberrations.

It may be further preferred that the glass article has trenches on the surface, wherein the aspect ratio of the trench depth to the width is at least 5:1, optionally at least 7:1, optionally at least 10:1, optionally at least 20:1. It may be preferred that the glass article has trenches on the surface, wherein the aspect ratio of the trench depth to the width is from 5:1 to 500:1, optionally from 7:1 to 200:1, optionally from 10:1 to 100:1, optionally from 20:1 to 50:1. Such well-defined structures patterned on the glass article have several applications for micro-optical elements and e.g. also silicon transistors which are often isolated by trenches. Trenches also provide the basic structure for the fabrication of capacitors in RAM memories.

Provided that the glass article is a wafer with a thickness >0.2 mm, it may be preferred that the warp is 200 μm or less, optionally 100 µm or less, optionally 50 µm or less, optionally 20 µm or less, optionally 10 µm or less. Provided that the glass article is a wafer with a thickness >0.2 mm, it may be preferred that the warp is 0.1 µm or more, optionally 0.5 µm or more, optionally 1.0 µm or more, optionally 2.0 µm or more, optionally 5.0 µm or more. It may be further preferred that the warp is 0.1 to 200 µm, optionally 0.5 to 100 µm, optionally 1.0 to 50 µm, optionally 2.0 to 20 µm, optionally 5.0 to 10 µm.

In some embodiments, the glass article has an optical transmission of at least 50%, optionally at least 60%, optionally at least 70%, optionally at least 80%, measured over a wavelength range of 400 to 2500 nm, and at a glass thickness of 1 mm. In other words, if the glass article is a glass plate or is formed into a glass plate, wherein the plate has a thickness of 1 mm, the glass article has an optical transmission of at least 50%, optionally at least 60%, optionally at least 70%, optionally at least 80%, measured over a wavelength range of 400 to 2500 nm. The absence of $Ti^{3+}$ and $Nb^{2+/4+}$ species provides a desirable optical transmission in the visible wavelength range of the electromagnetic spectrum, e.g. between 400 and 800 nm.

Use of a Glass Composition, and Use of a Glass Article

In some embodiments, the invention relates to a use of a glass composition provided according to the invention or a use of a glass article provided according to the invention in a microstructuring process, wherein optionally the microstructuring process is reactive ion etching.

In some embodiments, use of the glass composition relates to a use for microcameras suitable for mobile phone applications, automotive applications and industrial safety applications, or as a structured glass substrate for optical communication, e.g. in an glass sheet with integrated waveguides, sometimes referred to as "optoboard".

The glass composition combines several advantageous properties because it forms volatile fluorides during RIE conditions which do not precipitate on the microstructures, and is characterised by an average coefficient of thermal expansion similar to typical semiconductor materials (e.g. silicon and silicon nitride) while at the same time providing sufficient chemical resistance which meets the standards for similar technical glasses. The presented glass compositions are therefore useful in microstructuring processes, particularly when the microstructuring process is reactive ion etching. Glass compositions and glass articles made from the compositions are hence particularly suitable for microoptical and/or microfabrication applications.

In some embodiments, the invention relates to a use of a glass composition provided according to the invention or a use of a glass article provided according to the invention in a microstructuring process, wherein optionally the microstructuring process is reactive ion etching, wherein microstructures are formed in the glass article comprising the glass composition.

In some embodiments, the invention relates to a use of a glass article as a micro-optical element or a microstructured elements, such as a lens, a mirror or an (optical) waveguide.

In some embodiments, the invention relates to a use of a glass composition in a reactive ion etching (RIE) process, e.g. for the microstructuring of precursor elements suitable for the manufacture of microstructured $SiO_2$ wafers.

Advantageously, the glass composition and the glass article provided according to the invention avoids and/or minimises the formation of non-volatile fluorides during RIE conditions. Elemental oxides present in the glass composition or the glass article are thus mainly or fully converted into their respective fluorides. The obtained fluorides are sufficiently volatile so that they can be removed from the reactor system e.g. by a vacuum pump or another way of flow through the reactor system at a sufficiently reduced pressure.

Method for the Production of a Glass Composition

In some embodiments, the invention relates to a method for the production of a glass composition comprising the steps of melting the glass composition, specifically melting a batch of raw materials yielding the oxides comprised in the glass composition, wherein the batch of raw materials is essentially free of fluorides; establishing and/or maintaining conditions during the melting step which prevent the chemical reduction of redox-active species, optionally maintaining oxidising conditions; optionally forming, e.g. floating, down-drawing, slot down-drawing, overflow down-drawing and re-drawing, or casting the molten glass composition; and optionally cold reworking of the glass composition into wafers.

In some embodiments, of the method, the conditions during the melting step which prevent the chemical reduction of redox-active species are established and/or maintained by one or more of the following ways:

a. reducing the melting temperature of the glass composition below 1650° C., optionally below 1500° C., optionally below 1400° C., and optionally below 1300° C.;

b. melting the redox-insensitive oxide species, such as $SiO_2$, $GeO_2$, $BPO_4$, in a first step, and melting the redox-active species, such as $TiO_2$ and $Nb_2O_5$, in a subsequent step, wherein the melting temperature during the subsequent step is at or below 1500° C., and optionally below 1300° C.;

c. melting the components in a substantially pure oxygen atmosphere and/or under oxygen bubbling;

d. adding an oxidising agent, such as $Sb_2O_5$ and $SnO_2$.

In some embodiments of the method, the melting temperature of the glass composition is reduced below 1650° C., optionally below 1500° C., and optionally below 1300° C. In view of the relatively high melting temperatures of the raw (oxide) ingredients, e.g. $SiO_2$ (quartz sand) having 1713° C., $TiO_2$ having 1843° C. and $Nb_2O_5$ having 1512° C., the first step of melting the glass composition, specifically melting a batch of raw materials yielding the oxides comprised in the glass composition, needs to be modified. For example, $GeO_2$ melts at a relatively low temperature of 1115° C. It is thus preferred to perform the step of melting the glass composition by a step-wise production of the glass melt, e.g. by first melting the redox-insensitive raw (oxide) ingredients, such as $SiO_2$, $GeO_2$, $BPO_4$. At that stage, the melting temperature is not critical due to absence of redox-active species, such as Ti and Nb. In a subsequent or second step the temperature of the glass melt is lowered, i.e. below 1650° C., optionally below 1500° C., and optionally below 1300° C., and then any redox-sensitive raw (oxide) ingredients, such as $TiO_2$ and $Nb_2O_5$, are added to the glass melt. This step-wise production of the glass melt may be advantageous because the redox-chemical reduction of $TiO_2$ and $Nb_2O_5$ is suppressed which is due to the less favored generation of molecular oxygen ($O_2$) at lower temperatures.

In some embodiments, reducing the melting temperature of the glass composition is effected by the use of alternative raw ingredients for the Ti and Nb species, for example oxysulfates, such as e.g. $TiOSO_4$. The oxysulfates of Ti and Nb decompose at temperatures of 500° C. to 600° C. and provide for a distribution and/or dissolution of the in-situ generated $TiO_2$ and $Nb_2O_5$ within the glass melt which is faster than adding the raw (oxide) ingredients $TiO_2$ and $Nb_2O_5$ to the glass melt. Because the distribution and/or dissolution of the in-situ generated $TiO_2$ and $Nb_2O_5$ is faster allows a further reduction of the melting temperature.

In some embodiments of the method, melting the components occurs in a substantially pure oxygen atmosphere and/or under oxygen bubbling. It may be even further preferred to perform melting the components in a substantially pure oxygen atmosphere and/or under oxygen bubbling at a pressure of at least 0.2 MPa, optionally at least 0.5 MPa, optionally at least 2.0 MPa, optionally at least 5.0 MPa, optionally at least 10.0 MPa. According to the Le Chatelier principles, feeding oxygen into the reaction system counters the decomposition of $TiO_2$ into $Ti_2O_3$ and $O_2$, and shifts the equilibrium (back) towards $TiO_2$, even at higher temperatures, such as e.g. 1600° C.

In some embodiments of the method, the step-wise production of the glass melt, i.e. first melting the redox-insensitive raw (oxide) ingredients, the lowering of the temperature of the glass melt, and the subsequent addition of the redox-sensitive raw (oxide) ingredients to the glass melt, is combined melting the components in a substantially pure oxygen atmosphere and/or under oxygen bubbling, optionally at a pressure of at least 0.2 MPa, optionally at least 0.5 MPa, optionally at least 2.0 MPa, optionally at least 5.0 MPa, optionally at least 10.0 MPa. This combination may be advantageous as it further reduces the undesired redox-chemical reduction of $TiO_2$ and $Nb_2O_5$.

In some embodiments of the method, the molar ratio between $B_2O_3$ and $P_2O_5$ is adjusted to 2:1, optionally 5:1, optionally 10:1. In some embodiments of the method, the $P_2O_5$ is absent. This may be advantageous because the equilibrium of e.g. the $TiO_2$ decomposition into $Ti_2O_3$ and $O_2$ is shifted to the undesired species ($Ti_2O_3$ and $O_2$) in a more acidic environment established by $P_2O_5$. A complete replacement of $P_2O_5$ by $B_2O_3$ provides glass compositions with essentially no $Ti^{3+}$ absorption. It may thus be preferred to provide a glass composition comprising 0 mol % $P_2O_5$ and 30 mol % $B_2O_3$. On the contrary, larger amounts of $B_2O_3$ makes the glass composition more hygroscopic which can be detected by an OH-absorption peak in the IR spectral range. It may thus be further preferred that the method includes a dehydration and/or drying step of the glass melt, e.g. by bubbling with dry gas, optionally dry oxygen, when the molar ratio between $B_2O_3$ and $P_2O_5$ is adjusted to 2:1, optionally 5:1, optionally 10:1, or complete absence of $P_2O_5$.

In some embodiments of the method, an oxidising agent, such as $Sb_2O_5$ and $SnO_2$ is added. This may be advantageous because it suppresses the formation of e.g. $Ti^{3+}$. It may be preferred that the oxidising agent also forms volatile fluorides during RIE process and/or applications. It may be particularly preferred to use $SnO_2$ as an oxidising agent, which decomposes and releases $O_2$ at a temperature range between 1500° C. and 1630° C.

Exemplary Embodiments

In some embodiments, the invention relates to a glass composition, wherein
    a. the working point $V_A$ of the composition is 1400° C. or less,
    b. alkali metal oxides, alkali earth metal oxides and iron oxides are present in an amount of less than 0.5 mol % in the composition, based on all oxides present in the glass composition, and
    c. the composition has a hydrolytic resistance characterized by a leachability of $GeO_2$, $P_2O_5$ and/or $B_2O_3$ from the composition determined as concentrations in an eluate prepared according to ISO 719 of
    i. less than 70 mg/l $GeO_2$ in the eluate per 1 mol % $GeO_2$ in the glass composition, and/or
    ii. less than 70 mg/l $P_2O_5$ in the eluate per 1 mol % $P_2O_5$ in the glass composition, and/or
    iii. less than 300 mg/l $B_2O_3$ in the eluate per 1 mol % $B_2O_3$ in the glass composition,
    wherein the glass composition comprises, based on all oxides present in the glass composition, at least 2 mol % $TiO_2$ and/or at least 2 mol % $Nb_2O_5$.

In some embodiments, the invention relates to a glass composition, wherein
    a. the working point $V_A$ of the composition is 1400° C. or less,
    b. alkali metal oxides, alkali earth metal oxides and iron oxides are present in an amount of less than 0.5 mol % in the composition, based on all oxides present in the glass composition, and
    c. the composition has a hydrolytic resistance characterized by a leachability of $GeO_2$, $P_2O_5$ and/or $B_2O_3$ from the composition determined as concentrations in an eluate prepared according to ISO 719 of
    i. less than 70 mg/l $GeO_2$ in the eluate per 1 mol % $GeO_2$ in the glass composition, and/or
    ii. less than 70 mg/l $P_2O_5$ in the eluate per 1 mol % $P_2O_5$ in the glass composition, and/or
    iii. less than 300 mg/l $B_2O_3$ in the eluate per 1 mol % $B_2O_3$ in the glass composition,
    wherein the glass composition comprises, based on all oxides present in the glass composition, 5 to 30 mol % $GeO_2$.

In some embodiments, the invention relates to a glass composition, wherein
    a. the working point $V_A$ of the composition is 1400° C. or less,
    b. alkali metal oxides, alkali earth metal oxides and iron oxides are present in an amount of less than 0.5 mol % in the composition, based on all oxides present in the glass composition, and
    c. the composition has a hydrolytic resistance characterized by a leachability of $GeO_2$, $P_2O_5$ and/or $B_2O_3$ from the composition determined as concentrations in an eluate prepared according to ISO 719 of
    i. less than 70 mg/l $GeO_2$ in the eluate per 1 mol % $GeO_2$ in the glass composition, and/or
    ii. less than 70 mg/l $P_2O_5$ in the eluate per 1 mol % $P_2O_5$ in the glass composition, and/or
    iii. less than 300 mg/l $B_2O_3$ in the eluate per 1 mol % $B_2O_3$ in the glass composition,
    wherein the glass composition comprises, based on all oxides present in the glass composition, 10 to 55 mol % $SiO_2$, 5 to 30 mol % $B_2O_3$, 5 to 30 mol % $P_2O_5$,
    wherein the sum of $B_2O_3$, $P_2O_5$, $GeO_2$, $TiO_2$ and $Nb_2O_5$ is at least 35 mol %,
    and wherein the sum of $B_2O_3$ and $P_2O_5$ is less than 35 mol %.

In some embodiments, the invention relates to a glass composition, wherein
    a. the working point $V_A$ of the composition is 1400° C. or less,
    b. alkali metal oxides, alkali earth metal oxides and iron oxides are present in an amount of less than 0.5 mol % in the composition, based on all oxides present in the glass composition, and
    c. the composition has a hydrolytic resistance characterized by a leachability of $GeO_2$, $P_2O_5$ and/or $B_2O_3$ from the composition determined as concentrations in an eluate prepared according to ISO 719 of i. less than 70 mg/l $GeO_2$ in the eluate per 1 mol % $GeO_2$ in the glass composition, and/or ii. less than 70 mg/l $P_2O_5$ in the eluate per 1 mol % $P_2O_5$ in the glass composition, and/or iii. less than 300 mg/l $B_2O_3$ in the eluate per 1 mol % $B_2O_3$ in the glass composition, wherein the glass composition comprises, based on all oxides present in the glass composition, 40 to 55 mol % $SiO_2$, 10 to 30 mol % $B_2O_3$, 10 to 18 mol % $P_2O_5$, wherein the sum of $B_2O_3$, $P_2O_5$, $GeO_2$, $TiO_2$ and $Nb_2O_5$ is at least 45 mol %, and wherein the sum of $B_2O_3$ and $P_2O_5$ is less than 35 mol %.

In some embodiments, the invention relates to a glass composition comprising, based on all oxides present in the glass composition, a. 10 to 55 mol % $SiO_2$, b. 5 to 30 mol % $B_2O_3$, c. 5 to 30 mol % $P_2O_5$, d. 5 to 30 mol % $GeO_2$, and e. at least 2 mol % $TiO_2$ and/or at least 2 mol % $Nb_2O_5$, wherein the sum of $B_2O_3$, $P_2O_5$, $GeO_2$, $TiO_2$ and $Nb_2O_5$ is at least 35 mol %, wherein the sum of $B_2O_3$ and $P_2O_5$ is less than 35 mol %, wherein alkali metal oxides, alkali earth metal oxides and iron oxides are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition.

In some embodiments, the invention relates to a glass composition comprising, based on all oxides present in the glass composition, a. 40 to 55 mol % $SiO_2$, b. 10 to 30 mol % $B_2O_3$, c. 10 to 18 mol % $P_2O_5$, d. 10 to 18 mol % $GeO_2$, and e. at least 2 mol % $TiO_2$ and/or at least 2 mol % $Nb_2O_5$, wherein the sum of $B_2O_3$, $P_2O_5$, $GeO_2$, $TiO_2$ and $Nb_2O_5$ is at least 45 mol %, wherein the sum of $B_2O_3$ and $P_2O_5$ is less than 35 mol %, wherein alkali metal oxides, alkali earth metal oxides and iron oxides are present in an amount of less than 0.5 mol % in the composition, optionally less than 0.3 mol %, optionally less than 0.2 mol %, optionally less than 0.1 mol %, optionally less than 0.05 mol %, optionally less than 0.025 mol %, based on all oxides present in the glass composition.

In some embodiments, the invention relates to a glass composition comprising, based on all oxides present in the glass composition.

a. 10 to 55 mol % $SiO_2$, b. 5 to 30 mol % $B_2O_3$, c. 5 to 30 mol % $P_2O_5$, d. 5 to 30 mol % $GeO_2$, and e. at least 2 mol % $TiO_2$ and/or at least 2 mol % $Nb_2O_5$, wherein the sum of $B_2O_3$, $P_2O_5$, $GeO_2$, $TiO_2$ and $Nb_2O_5$ is at least 35 mol %, wherein the sum of $B_2O_3$ and $P_2O_5$ is less than 35 mol %, wherein alkali metal oxides, alkali earth metal oxides and iron oxides are present in an amount of less than 0.5 mol % in the composition, based on all oxides present in the glass composition, wherein the working point $V_A$ of the composition is 1400° C. or less.

In some embodiments, the invention relates to a glass composition comprising, based on all oxides present in the glass composition, a. 10 to 55 mol % $SiO_2$, b. 5 to 30 mol % $B_2O_3$, c. 5 to 30 mol % $P_2O_5$, d. 5 to 30 mol % $GeO_2$, and e. at least 2 mol % $TiO_2$ and/or at least 2 mol % $Nb_2O_5$, wherein the sum of $B_2O_3$, $P_2O_5$, $GeO_2$, $TiO_2$ and $Nb_2O_5$ is at least 35 mol %, wherein the sum of $B_2O_3$ and $P_2O_5$ is less than 35 mol %, wherein alkali metal oxides, alkali earth metal oxides and iron oxides are present in an amount of less than 0.5 mol % in the composition, based on all oxides present in the glass composition, wherein the composition has a hydrolytic resistance characterized by a leachability of $GeO_2$, $P_2O_5$ and/or $B_2O_3$ from the composition determined as concentrations in an eluate prepared according to ISO 719 of i. less than 70 mg/l $GeO_2$ in the eluate per 1 mol % $GeO_2$ in the glass composition, and/or ii. less than 70 mg/l $P_2O_5$ in the eluate per 1 mol % $P_2O_5$ in the glass composition, and/or iii. less than 300 mg/l $B_2O_3$ in the eluate per 1 mol % $B_2O_3$ in the glass composition.

Manufacture of the Glass Compositions

The described glass compositions were made according to the following procedure: A batch of raw materials yielding the oxides was mixed and melted at 1600° C. in a PtRh20 crucible, was subsequently refined at 1650° C. and stirred at 1600° C. The glass melt was kept in the crucible and maintained at 1650° C. until casting. Cooling from 680° C. down to ambient temperature was performed at a rate of 20 K/h.

The glass compositions provided according to the invention (Example 1 and 2) were initially melted at 1600 to 1650° C. $TiO_2$ and $Nb_2O_5$ were added directly to and mixed with all other oxide components.

The glass composition according to Example 6a was prepared by initially melting $SiO_2$, $GeO_2$, $BPO_4$ at 1600 to 1650° C. The glass composition according to Example 6b was prepared by initially melting $SiO_2$, $GeO_2$, $BPO_4$ at 1600 to 1650° C., and by adding 5 mol % $TiO_2$ in a subsequent step at 1500° C.

The glass compositions according to Example 4 was prepared under oxygen bubbling introduced into the glass melt during the melting phase and continued until casting.

Comparative examples and examples 1 to 5 and 6a/6b provided according to the invention Glass 2 from Table 1 (2/T.1) described in DE 10 2005 034 785 B3 serves as a first comparative example. Glass 2/T.1 has a low $V_A$ temperature and thus has a good meltability for e.g. reflow processing. The hydrolytic resistance of the glass 2/T.1 has been characterized by the leachability of the individual glass components $SiO_2$, $GeO_2$, $P_2O_5$ and $B_2O_3$ from the composition which has been determined according to the above described modified ISO 719 and is expressed as concentrations in the obtained eluate.

It is evident that the glass 2/T.1 has a low chemical resistance which can be appreciated from the absolute leachability data, i.e. 92 mg/l $SiO_2$, 985 mg/l $GeO_2$, 1282 mg/l $P_2O_5$ and 645 mg/l $B_2O_3$.

Examples 1 to 5 provided according to the invention were subject to the same analysis. The data for Examples 1 to 4 show a strongly reduced leachability for all components $SiO_2$, $GeO_2$, $P_2O_5$ and $B_2O_3$. Example 5 underlines that an increased $B_2O_3$ content in the absence of $P_2O_5$ has an adverse effect on the chemical resistance, determined again according to the above-described modified ISO 719 method.

As a second comparative example, a typical soda-lime glass has been analysed (Standardglas 1, Deutsche Glastechnische Gesellschaft, "DGG1"). Soda-lime glasses are well-known in the art used for windowpanes and glass containers, such as bottles and jars for beverages, food and commodity products. DGG1 has also been subject to the modified ISO 719.

In comparison with DGG1, 2/T.1 shows a severely reduced chemical resistance evidenced by an almost four-fold enhanced $SiO_2$-content of the eluate of 2/T.1.

TABLE 1

| Glass | Glass composition/mol % | | | | | | | | $n_d$ | $\rho$ g/cm³ | $T_G$ ° C. | $V_A$ ° C. | $SiO_2$ mg/l | $GeO_2$ mg/l | $B_2O_3$ mg/l | $P_2O_5$ mg/l |
| | $SiO_2$ | $TiO_2$ | $B_2O_3$ | $P_2O_5$ | $GeO_2$ | $Nb_2O_5$ | Rest | □ | | | | | | | | |
|---|---|---|---|---|---|---|---|---|---|---|---|---|---|---|---|---|
| DGG1 | 71.2 | | | | | | 28.8 | 100 | 1.51 | 2.53 | | 1022 | 26 | | | |
| 2/T.1 | 50 | | 15 | 15 | 20 | | | 100 | | | | 1110 | 92 | 985 | 645 | 1282 |
| 1 | 50 | 5 | 15 | 15 | 15 | | | 100 | | | | 1145 | 52 | 156 | 135 | 205 |
| 2 | 50 | | 15 | 15 | 15 | 5 | | 100 | | | | 1163 | 34 | 72 | 59 | 92 |
| 3 | 50 | 10 | 15 | 15 | 10 | | | 100 | | | | 1163 | 8.5 | 11.9 | 16.5 | 21 |
| 4 | 50 | 10 | 15 | 15 | 10 | | | 100 | 1.56 | 2.48 | 721 | 1173 | 28 | 42 | 69 | 68 |
| 5 | 50 | 10 | 30 | | 10 | | | 100 | 1.54 | 2.32 | 436 | 1250 | 68 | 673 | 7907 | 0 |
| 6a | 50 | | 20 | 20 | 10 | | | 100 | | | | | | | | |
| 6b | 47.5 | 5.01 | 19 | 19 | 9.5 | | | 100 | | | | | | | | |

Spectral Measurements

The spectral transmission of the generated glasses has been measured using a double beam spectral photometers from the company Perkin Elmer. The standard setup enables measurements within a wavelength region from 250 nm up to 2500 nm. The measurement accuracy over the complete spectrum is about ±0.5%. Within 400 nm to 700 nm the accuracy is ±0.3%. The wavelength can be measured with an accuracy of ±0.2 nm and ±0.8 nm. Glass samples had a thickness of about 1 mm.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass composition, comprising oxides which form non-volatile fluorides at a temperature of 150° C. and a pressure of 5 Pa or less and are present in an amount of less than 0.5 mol % in the glass composition, based on all oxides present in the glass composition, wherein a working point of the glass composition is 1400° C. or less, wherein the glass composition has a hydrolytic resistance characterized by a leachability of $GeO_2$, $P_2O_5$ and/or $B_2O_3$ from the glass composition determined as concentrations in an eluate prepared according to ISO 719 of at least one of the following:

less than 70 mg/l $GeO_2$ in the eluate per 1 mol % $GeO_2$ in the glass composition;
    less than 70 mg/l $P_2O_5$ in the eluate per 1 mol % $P_2O_5$ in the glass composition; or
    less than 300 mg/l $B_2O_3$ in the eluate per 1 mol % $B_2O_3$ in the glass composition;

wherein the glass composition comprises, based on all oxides present in the glass composition, at least 2 mol % $TiO_2$ and/or at least 2 mol % $Nb_2O_5$.

2. The glass composition of claim 1, wherein the glass composition comprises at least 4 mol % $TiO_2$ and/or at least 4 mol % $Nb_2O_5$.

3. The glass composition of claim 1, wherein the glass composition comprises, based on all oxides present in the glass composition, 5 to 30 mol % $GeO_2$.

4. The glass composition of claim 3, wherein the glass composition comprises 10 to 18 mol % $GeO_2$.

5. The glass composition of claim 1, wherein the glass composition is free, except for impurities, of alkali metal oxides and alkali earth metal oxides.

6. The glass composition of claim 1, wherein the glass composition comprises, based on all oxides present in the glass composition:

10 to 55 mol % $SiO_2$;
    5 to 30 mol % $B_2O_3$;
    5 to 30 mol % $P_2O_5$;
    wherein a sum of $B_2O_3$, $P_2O_5$, $GeO_2$, $TiO_2$ and $Nb_2O_5$ is at least 35 mol and a sum of $B_2O_3$ and $P_2O_5$ is less than 35 mol %.

7. The glass composition of claim 1, wherein the glass composition exclusively comprises oxides which form volatile fluorides at a temperature of 150° C. and a pressure of 5 Pa or less.

8. The glass composition of claim 1, wherein the glass composition has an average coefficient of thermal expansion, measured according to DIN ISO 7991:1987 in a temperature range of 20° C. to 300° C. that is from 1 to 6 ppm/K.

9. The glass composition of claim 1, wherein the glass composition has a refractive index of between 1.45 and 1.80 and/or an Abbe number that is at least 45.

10. The glass composition of claim 1, comprising, based on all oxides present in the glass composition:

10 to 55 mol % $SiO_2$;
    5 to 30 mol % $B_2O_3$;
    5 to 30 mol % $P_2O_5$;
    5 to 30 mol % $GeO_2$; and
    at least 2 mol % $TiO_2$ and/or at least 2 mol % $Nb_2O_5$;
    wherein a sum of $B_2O_3$, $P_2O_5$, $GeO_2$, $TiO_2$ and $Nb_2O_5$ is at least 35 mol and a sum of $B_2O_3$ and $P_2O_5$ is less than 35 mol %.

11. The glass composition of claim 1, wherein a molar ratio between $B_2O_3$ and $P_2O_5$ is from 1:2 to 2:1.

12. The glass composition of claim 1, wherein a total amount of $Ti_2O_3$ and TiO in the glass composition is less than 0.5 mol and/or a total amount of $NbO_2$ and NbO in the glass composition is less than 0.5 mol %, based on all oxides present in the glass composition.

13. A glass article, comprising, a glass composition comprising oxides which form non-volatile fluorides at a temperature of 150° C. and a pressure of 5 Pa or less and are present in an amount of less than 0.5 mol % in the glass composition, based on all oxides present in the glass composition, wherein a working point of the glass composition is 1400° C. or less, wherein the glass composition has a hydrolytic resistance characterized by a leachability of $GeO_2$, $P_2O_5$ and/or $B_2O_3$ from the glass composition determined as concentrations in an eluate prepared according to ISO 719 of at least one of the following:

less than 70 mg/l $GeO_2$ in the eluate per 1 mol % $GeO_2$ in the glass composition;

less than 70 mg/l $P_2O_5$ in the eluate per 1 mol % $P_2O_5$ in the glass composition; or less than 300 mg/l $B_2O_3$ in the eluate per 1 mol % $B_2O_3$ in the glass composition;

wherein the glass article is at least one of the following:

formed as a sheet, a plate, a bar, and/or a flat glass;

a surface-structured and/or etched wafer, a surface-structured and/or etched optical wafer, and/or a glass waveguide panel;

a substrate glass for a radio-frequency microelectromechanical system; or an article structured via reactive ion etching.

14. The glass article of claim 13, wherein the glass article has one or more of the following properties:

a difference of an average coefficient of thermal expansion of the glass article and polycrystalline silicon is less than 1.0 ppm/K measured according to DIN ISO 7991:1987 in a temperature range of 20° C. to 300° C.;

a surface roughness, measured according to ISO 25178: 2010-2020, of 100 nm or less;

trenches on a surface, wherein an aspect ratio of a trench depth to a width is at least 5:1;

an etch rate of 0.03 μm min$^{-1}$ or more, determined in an etch rate test using $CHF_3/O_2$-plasma (97.5 vol. %/2.5 vol. %) at 700 eV, at 200 μA cm$^{-2}$, at an ion incidence angle of 0°, using an ion beam etch apparatus ISA150 with a 6"-Kaufman ion beam source with neutralisation; or the glass article is a wafer with a thickness >0.2 mm and a warp of 200 μm or less according to ASTM F657: 1999.

15. The glass article of claim 13, wherein the glass composition comprises, based on all oxides present in the glass composition:

10 to 55 mol % $SiO_2$;

5 to 30 mol % $B_2O_3$;

5 to 30 mol % $P_2O_5$;

wherein a sum of $B_2O_3$, $P_2O_5$, $GeO_2$, $TiO_2$ and $Nb_2O_5$ is at least 35 mol and a sum of $B_2O_3$ and $P_2O_5$ is less than 35 mol %.

16. The glass article of claim 13, wherein the glass article comprises, based on all oxides present in the glass composition:

10 to 55 mol % $SiO_2$;

5 to 30 mol % $B_2O_3$;

5 to 30 mol % $P_2O_5$;

5 to 30 mol % $GeO_2$; and at least 2 mol % $TiO_2$ and/or at least 2 mol % $Nb_2O_5$;

wherein a sum of $B_2O_3$, $P_2O_5$, $GeO_2$, $TiO_2$ and $Nb_2O_5$ is at least 35 mol and a sum of $B_2O_3$ and $P_2O_5$ is less than 35 mol %.

17. The glass article of claim 13, wherein the glass composition has a molar ratio between $B_2O_3$ and $P_2O_5$ that is from 1:2 to 2:1.

18. The glass article of claim 13, wherein a total amount of $Ti_2O_3$ and TiO in the glass composition is less than 0.5 mol and/or a total amount of $NbO_2$ and NbO in the glass composition is less than 0.5 mol %, based on all oxides present in the glass composition.

19. The glass article of claim 13, wherein the glass composition has a refractive index of between 1.45 and 1.80 and/or an Abbe number that is at least 45.

20. A glass composition, comprising oxides which form non-volatile fluorides at a temperature of 150° C. and a pressure of 5 Pa or less and are present in an amount of less than 0.5 mol % in the glass composition, based on all oxides present in the glass composition, wherein a working point of the glass composition is 1400° C. or less, wherein the glass composition has a hydrolytic resistance characterized by a leachability of $GeO_2$, $P_2O_5$ and/or $B_2O_3$ from the glass composition determined as concentrations in an eluate prepared according to ISO 719 of at least one of the following:

less than 70 mg/l $GeO_2$ in the eluate per 1 mol % $GeO_2$ in the glass composition;

less than 70 mg/l $P_2O_5$ in the eluate per 1 mol % $P_2O_5$ in the glass composition; or less than 300 mg/l $B_2O_3$ in the eluate per 1 mol % $B_2O_3$ in the glass composition;

wherein the glass composition comprises, based on all oxides present in the glass composition:

10 to 55 mol % $SiO_2$;

5 to 30 mol % $B_2O_3$; and 5 to 30 mol % $P_2O_5$; wherein a sum of $B_2O_3$, $P_2O_5$, $GeO_2$, $TiO_2$ and $Nb_2O_5$ is at least 35 mol and a sum of $B_2O_3$ and $P_2O_5$ is less than 35 mol %.

21. The glass composition of claim 20, wherein the glass composition comprises 5 to 30 mol % $GeO_2$ and/or at least 2 mol % $TiO_2$ and/or at least 2 mol % $Nb_2O_5$.

* * * * *